United States Patent
Kravitz

[11] Patent Number: 5,810,231
[45] Date of Patent: Sep. 22, 1998

[54] BICYCLE CARRIER

[76] Inventor: Harley A. Kravitz, 3041 Brainard Rd., Pepper Pike, Ohio 44124

[21] Appl. No.: 847,947

[22] Filed: May 1, 1997

[51] Int. Cl.$^6$ ..................................................... B60R 9/10
[52] U.S. Cl. ........................... 224/532; 224/536; 224/924
[58] Field of Search .................................... 224/532, 536, 224/512, 514, 515, 924

[56] References Cited

U.S. PATENT DOCUMENTS

| | | |
|---|---|---|
| 2,431,400 | 11/1947 | Iverson . |
| 2,512,267 | 6/1950 | Donnelley ............................... 224/924 |
| 3,765,581 | 10/1973 | Kosecoff ................................. 224/924 |
| 3,794,227 | 2/1974 | Stearne ................................... 224/924 |
| 3,841,544 | 10/1974 | Berger . |
| 4,050,616 | 9/1977 | Mosow ............................... 224/532 X |
| 4,299,341 | 11/1981 | Copeland ............................... 224/924 |
| 4,318,501 | 3/1982 | Graber ................................... 224/924 |
| 4,386,709 | 6/1983 | Graber ................................... 224/924 |
| 4,461,410 | 7/1984 | Tartaglia . |
| 4,640,658 | 2/1987 | Webb, Jr. . |
| 4,676,413 | 6/1987 | Began et al. . |
| 4,676,414 | 6/1987 | Deguevara . |
| 4,856,686 | 8/1989 | Workentine . |
| 4,875,608 | 10/1989 | Graber ................................... 224/924 |
| 5,219,105 | 6/1993 | Kravitz . |
| 5,476,202 | 12/1995 | Lipp ....................................... 224/924 |

OTHER PUBLICATIONS

Ideal Ideas International literature "The Bike Slider", 1986.
ACAR Industries Inc. literature, p. 107–no date.
Troxel carrier literature, part No. 18–123–no date.
ACAR Industries, Inc. literature on Cycle Hiker System II, Part Nos. 31–9–1, –2, –2A, –3, –3A, –3B; 31–10, –10A, –11, –11A and –11A–RV–no date.
ACAR Industries, Inc. literature "Recreational Vehicle Equipment & Travel Accessories", pp. 4–7–no date.

*Primary Examiner*—Renee S. Luebke
*Attorney, Agent, or Firm*—Watts, Hoffmann, Fisher & Heinke Co., L.P.A.

[57] ABSTRACT

A vehicle bicycle carrier having a pair of mounting brackets and a pair of upstanding supports respectively carried by the brackets is disclosed. The supports each have an upstanding, converging portion and a rearwardly extending bicycle support arm. A brace inter-connects the upstanding portions. Cushions are secured to the arms for cushioning support of bicycles held in place by a plurality of J-hooks each having a shank projecting into associated hook receiving apertures in an arm. Each J-hook includes a bicycle restraint portion and a threaded end portion carrying an internally threaded knob.

4 Claims, 3 Drawing Sheets

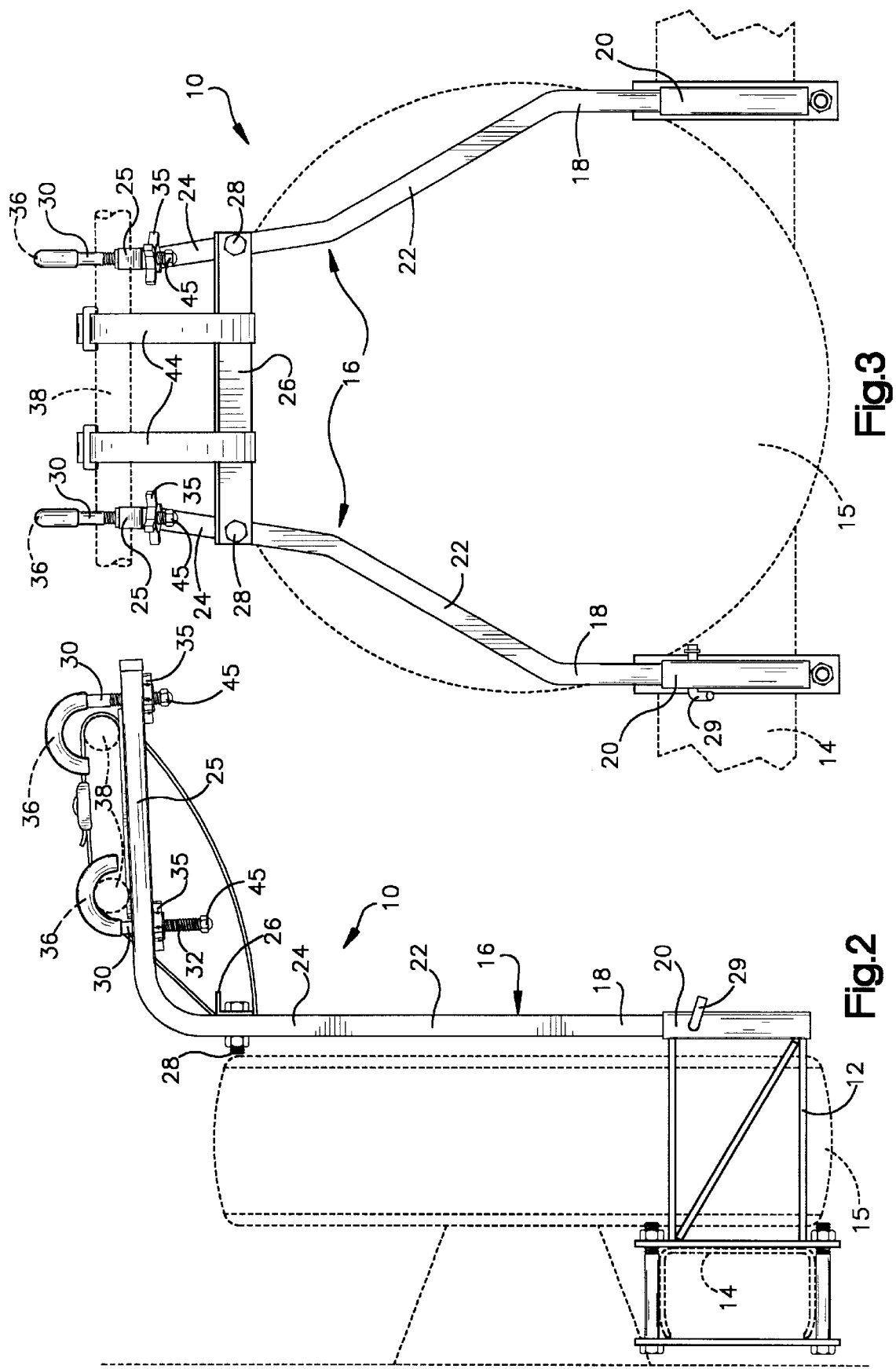

BICYCLE CARRIER

This invention relates to vehicle mounted bicycle carriers and kits for making such carriers. More particularly this invention relates to carriers which are especially suited for mounting on vehicles having externally mounted spare tires, such as recreational vehicles.

BACKGROUND OF THE INVENTION

Bicycle carriers for attachment to various types of automotive vehicles are now in relatively wide usage. While there have been a variety of such carriers constructed, prior carriers, especially those for mounting bicycles to the rear of recreational vehicles (RV's), have had drawbacks. The typical carrier is a relatively complex assembly made from a kit which has too many parts. Once assembled there is a tendency for interconnected parts to loosen. The strength of a typical prior carrier has not been what it should be, as components have typically had tendencies to bend, as well as having part interconnections which tended to loosen. All too often, the result of these shortcomings is damage to the bicycles themselves. As quality and cost of bicycles has increased, such damage is an increasing problem.

Another shortcoming has been the methods for securing the bicycles to the carriers have had shortcomings as well. Shock cord is often used. Such cord, even when new, often permits excessive bicycle movement relative to the carrier and in any event can cause bicycle damage, especially when the transporting vehicle traverses a rough or uneven terrain.

SUMMARY OF THE INVENTION

The foregoing shortcomings and others are overcome by bicycle carriers made in accordance with the present invention. Tests indicate that the novel and improved carrier is as much as fifty percent stronger than predecessors of the same class of carriers. Moreover, the improved carrier provides secure bicycle hold down without imposing undue stresses on transported bicycles.

A carrier made in accordance with the present invention utilizes two mounting brackets which are adapted to be connected to an RV bumper or the like. A pair of upstanding supports are respectively carried by the brackets. The supports are unitary, tubular members of square cross section. Each support has an upwardly extending base portion which is generally vertical when in use. Each of the supports also has an intermediate portion flaring upwardly and inwardly at an obtuse angle towards the opposing support with a further inwardly and upwardly converging arm support portion above the intermediate portion. Each support also includes an arm which projects rearwardly from the arm support portion in a generally horizontal but slightly upwardly slanted orientation when in use with a vehicle on a horizontal surface. The base, intermediate and arm support portions of the two supports are disposed about a common imaginary plane with the arm portions oriented generally orthogonally with respect to that imaginary plane.

A connecting element or brace is fixed to the supports to rigidify their relative positions. In addition, each of the supports is preferably formed of a unitary square tube that telescopes into a square tubular socket in its support bracket to prevent relative rotational movement of the supports with respect to the brackets.

Each of the arms includes a spaced pair of apertures. Two pairs of J-bolts are provided with the bolts of each pair having shanks extending through apertures in an associated one of the arms. Lower ends of the J-bolt shanks threadedly receive lock knobs. Each J-bolt has a permanently connected acorn nut on the lower end of its shank to prevent removal and loss of the lock knobs.

Upper end portions of the J-bolts are covered with plastic tubes for cushioned engagement with a bicycle cross bar to fix a transported bicycle on the arms. Each arm has a bicycle support cushion adhesively secured to its top, so that cross bars of supported bicycles are protected by the cushion and the plastic tubes around the upper end of the J-hooks.

As a security and enhancement to the securing of bicycles to the carrier, nylon straps are snugly wrapped around cross bars of supported bicycles and the brace element. The use of shock cord is avoided and with it, its potential for cord induced damage to transported bicycles.

Accordingly, the objects of the invention are to provide a novel and improved bicycle carrier which is especially adapted for use with a vehicle having an externally mounted spare tire and kits for fabricating such carriers.

BRIEF DESCRIPTION OF THE DRAWINGS

FIG. 2 is a side elevational view of the carrier of FIG. 1;

FIG. 3 is a rear elevational view of the carrier of FIG. 1; and,

Referring to FIGS. 1 to 3, the improved bicycle carrier of the present invention is shown generally at 10. The carrier includes a pair of known mounting brackets 12. The brackets 12 are shown as secured to a bumper 14 of an RV at spaced locations on opposite sides of a spare tire 15. A pair of mirror image supports 16 are provided. The supports 16 are formed of tubular material which is square in cross section. The supports each include a lower upstanding portion 18 telescopably received in a socket 20 at the outer end of an associated bracket 12.

Figure 1:
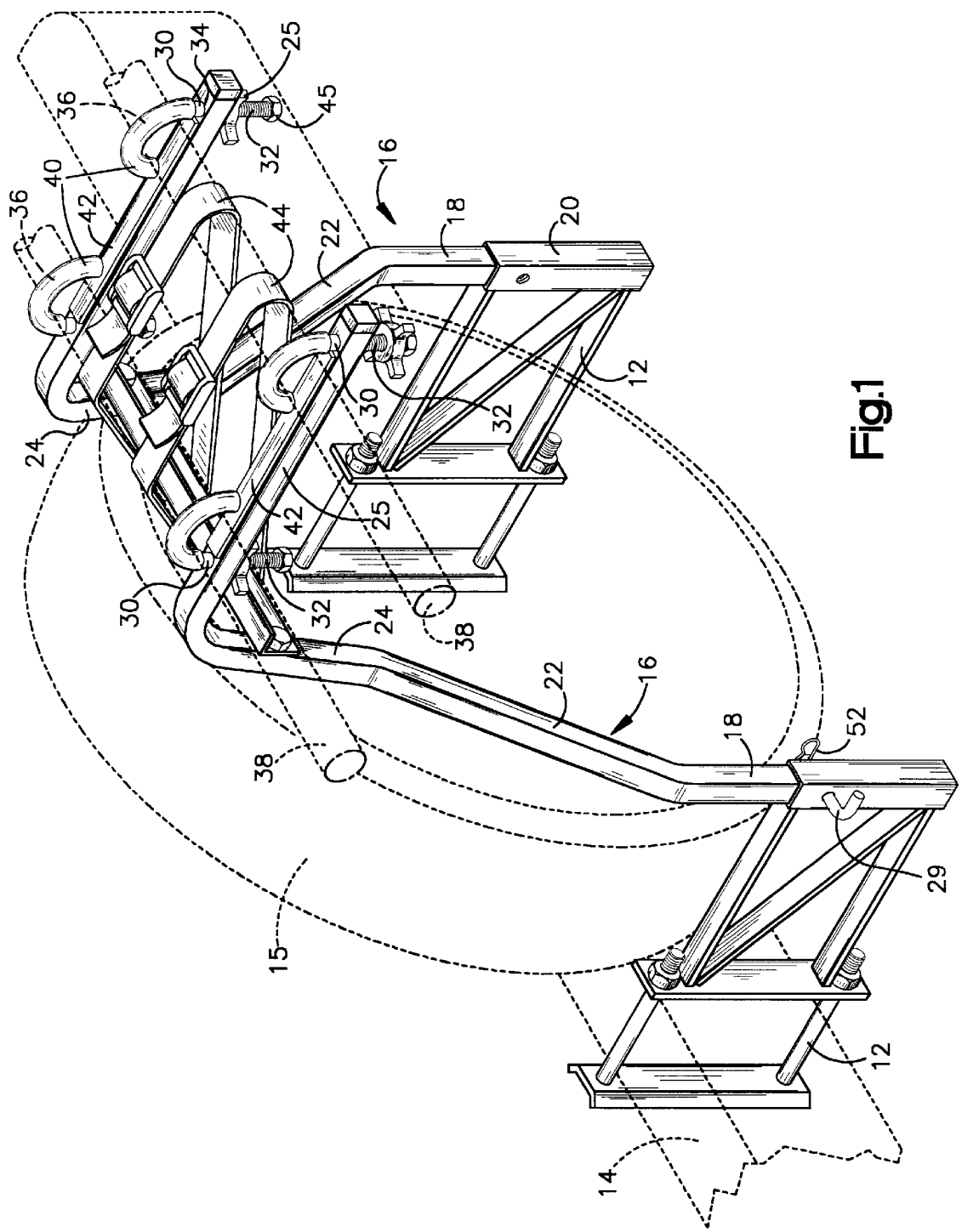
FIG. 1 is a perspective view of the carrier of the present invention with a phantom showing of an RV bumper and a spare tire.

Each of the supports 16 has an upwardly and inwardly flaring intermediate portion 22 extending upwardly from the lower portion 18. The intermediate portion is at an obtuse angle of the order of 150° with its connected lower portion.

The supports 16 further include upward inwardly flaring arm support portions 24 which are respectively at a further, opposite and flatter obtuse angle of the order of 140° with respect to the intermediate portion and of the order of 150° with respect to the axis of the lower portion. The supports terminate in arms 25 which project rearwardly from the arm support portions 24 in a generally horizontal orientation but sloping upwardly in a rearward direction at an angle of about 5° when the supporting vehicle is on horizontal terrain. The upward arm slope is provided to encourage supported bicycles to tend to lean toward a transporting vehicle.

The lower, intermediate and arm support portions 18, 22, 24 are symmetrical about a common imaginary plane, while the arms 25 project generally orthogonally rearwardly relative to that imaginary plane. A cross brace 26 is connected to the arm support portions 24 by bolts 28 to rigidify the entire assembly and maintain appropriate spaced relationship between the supports 16. A lock pin 29 projects through aligned apertures in one of the sockets 20 and its associated support 18 to prevent accidental removal of the carrier from the brackets.

Pairs of J-bolts 30 are respectively carried by the arms 24. The J-bolts include threaded shanks 32 which project through apertures 34 in the arms 25. Knobs 35 are threaded on the J-bolt shanks for tightening upper curved hook portions 36 of the J-bolts against bicycle cross bars shown in phantom at 38. The hook portions 36 are covered by plastic tubes 40 to protect the cross bars 38. In addition, foam pads 42 are adhesively secured to the arms 25 to provide cushioning support for the cross bars 38. Nylon restraining straps 44 are wrapped around the cross bars 38 and the cross brace 26 as a redundant hold down for safety purposes. Similarly acorn nuts 45 are permanently connected to outer ends of the J-bolt shanks 32 to prevent the knobs 35 from being removed from or falling off of their respective shanks.

The Carrier Kit

Figure 4:
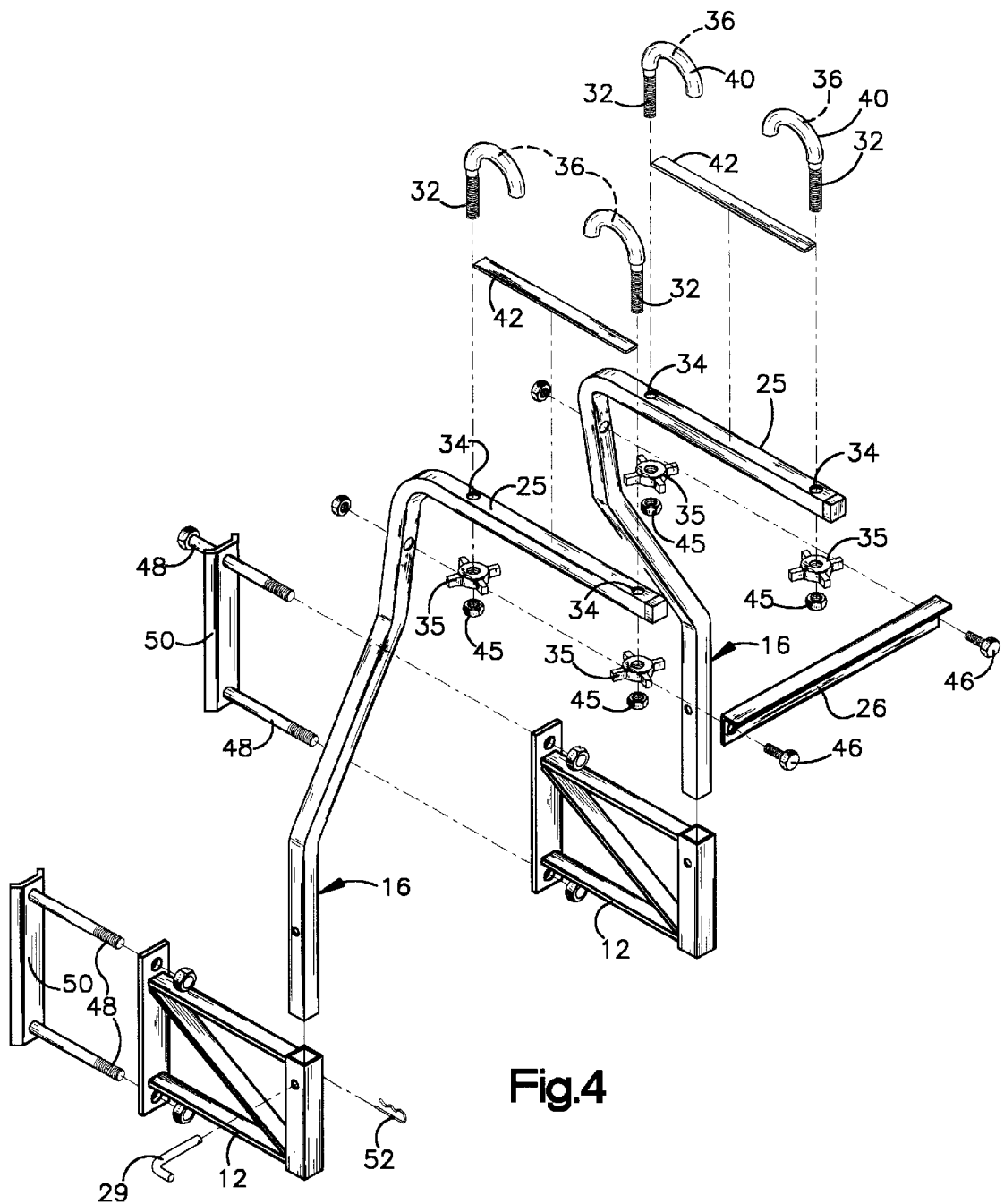
FIG. 4 is an exploded of the carrier kit of the present invention.

In its commercial form, the carrier of the present invention is sold in the form of a kit shown in the exploded view in FIG. 4. In assembly the vinyl sleeves 40 are slid over the curved hook portions 36 of the J-bolts. The cross brace or bar 26 is loosely attached to the supports 26 by nuts and bolts 46. Next, bracket bolts 48 are passed through bracket channels 50 and the brackets 12 are mounted on the bumper 14. The supports 16 are telescoped into the sockets 20, the relative positioning of the brackets and supports is adjusted until the entire sub-assembly is symmetrical about the spare tire 15. Once the brackets and supports are aligned as desired, nuts on the bracket bolts 48 and the cross brace bolts 46 are tightened to rigidify the entire assembly.

Next, the cushioning pads 42 are secured to the tops of the arms 25 by pressure sensitive adhesives. The J-bolt shanks 32 are inserted into the arm apertures 34. The knobs 35 are threaded onto the shanks 32. The acorn nuts 45 are permanently secured to the J-hook shanks 32 and the kit of FIG. 4 has been converted to the carrier of FIGS. 1–3. Finally, the lock pin 29 is inserted through aligned holes in the socket and support 20, 18. A lock clip 52 is applied to the pin to hold it in place.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:
1. A bicycle carrier kit for use with a vehicle having an externally mounted spare tire comprising:
   a) a pair of brackets for connection to a vehicle on opposite sides of such tire and extending rearwardly to locations rearward of the tire;
   b) a pair of unitary tubular supports for respective association with and connection to the brackets to position the supports behind such tire when the carrier is in use;
   c) the supports being mirror images of one another each including:
      i) a base portion for connection to its associated bracket;
      ii) a bend interconnecting an intermediate portion to extending from the base portion at an obtuse angle;
      iii) a further bend interconnecting an arm support portion to extend from the intermediate portion at another and lesser obtuse angle; and,
      iv) a still further bend interconnecting an arm portion to project orthogonally from the arm support portion;
   d) the base portions when in use being generally vertical with the intermediate and arm support portions flaring upwardly and toward one another;
   e) the base, intermediate and arm support portions of the supports being disposed about a common plane when the carrier is in use with the arm portions disposed generally orthogonal to the plane;
   f) a connecting element rigidly interconnecting the supports when the carrier is assembled; and,
   g) bicycle hold downs for connection to the arm portions.

2. The kit of claim 1 wherein each of the hold downs comprises a J-hook having a threaded shank and a threaded knob on the shank and wherein each shank is disposable in part within an associated aperture in one of the arm portions.

3. The kit of claim 2 wherein each J-hook further includes a curved bicycle bar engagement portion and a cushioning plastic element around the engagement portion.

4. The kit of claim 1 further including bicycle support pads each having a pressure sensitive adhesive surface for adhering each pad to an associated one of the arm portions.

* * * * *